United States Patent [19]

Shelly

[11] Patent Number: 4,558,893
[45] Date of Patent: Dec. 17, 1985

[54] NON-ROTATABLE TELESCOPING SUPPORT STRUCTURE

[75] Inventor: James E. Shelly, Walnutport, Pa.

[73] Assignee: Keystone Lamp Mfg. Corp., Slatington, Pa.

[21] Appl. No.: 516,027

[22] Filed: Jul. 22, 1983

[51] Int. Cl.[4] ............................................. F16L 19/00
[52] U.S. Cl. ............................. 285/354; 285/DIG. 8; 285/176; 403/104; 362/413; 248/161
[58] Field of Search ................ 285/DIG. 8, 343, 337, 285/354, 175, 176; 403/104, 374; 362/403, 413, 431; 248/161, 412

[56] References Cited

U.S. PATENT DOCUMENTS

| 960,151 | 5/1910 | Blumenthal | 403/104 X |
|---|---|---|---|
| 1,241,823 | 10/1917 | Couper | 403/104 X |
| 2,445,543 | 7/1948 | Thines | 248/354 |
| 2,584,446 | 2/1952 | Hastings et al. | 403/104 X |
| 2,902,592 | 9/1959 | Cole et al. | 362/413 X |
| 3,265,346 | 8/1966 | Petrick | 403/104 X |
| 4,238,818 | 12/1980 | Gindel | 362/413 |

FOREIGN PATENT DOCUMENTS 556222 8/1932 Fed. Rep. of Germany ...... 285/354

Primary Examiner—Richard J. Scanlan, Jr.
Attorney, Agent, or Firm—Seidel, Gonda, Goldhammer & Abbott

[57] ABSTRACT

A non-rotatable telescoping support structure particularly suited for use in a pole lamp includes an outer elongated tubular member having a bore of cross section the shape of a convex polygon and an inner tubular component having an outer surface with a cross section of shape corresponding to the cross-sectional shape of the outer component bore. The inner component is slidable within the bore of the outer component but relative rotation is prevented by engagement of the corner of the inner component with the inner surface of the outer component adjacent to the corner of the outer component bore. One end of the outer component has external threads on which a split ring assembly is threaded and tightened to deter relative longitudinal movement between the inner component and the outer component.

6 Claims, 5 Drawing Figures

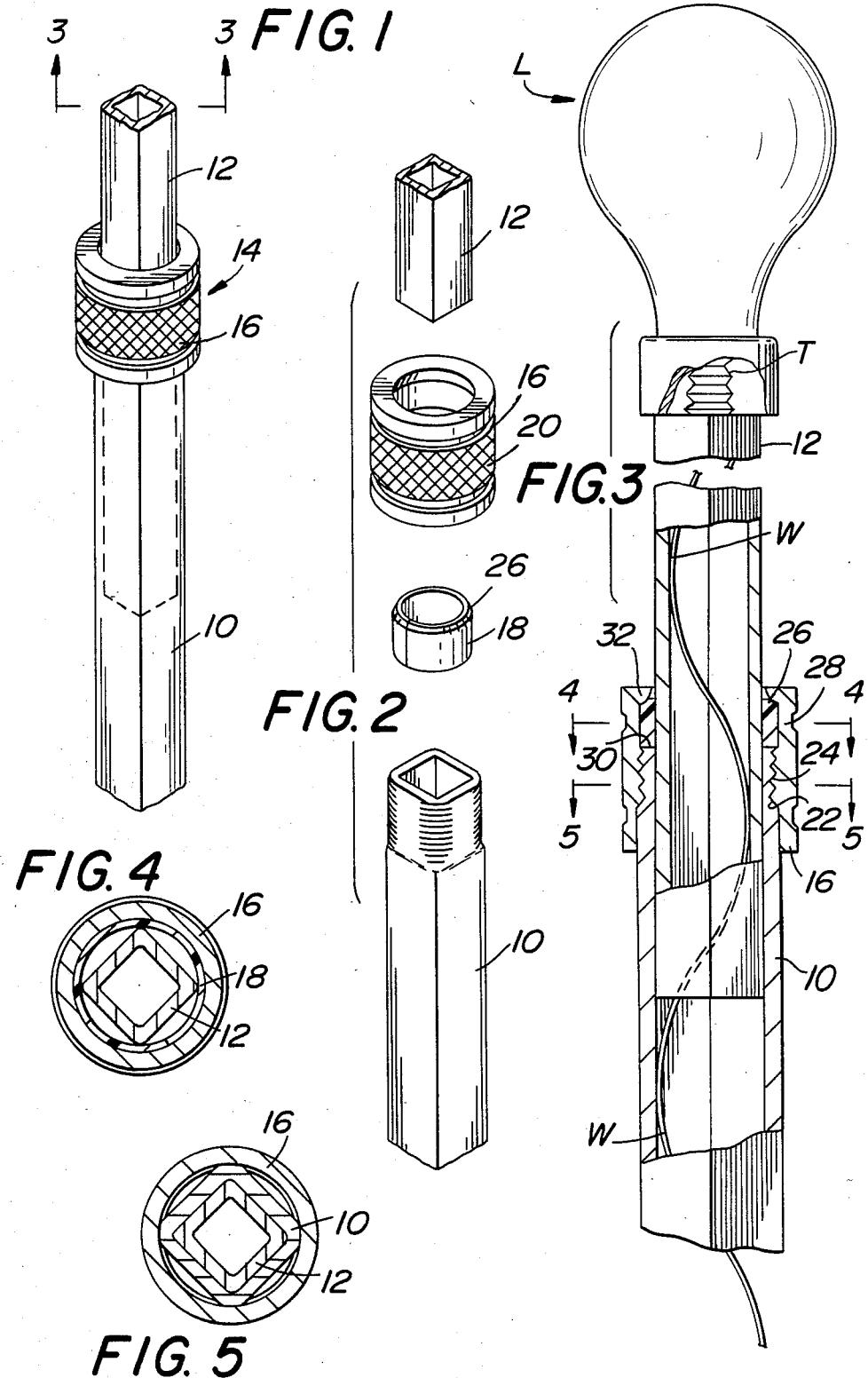

NON-ROTATABLE TELESCOPING SUPPORT STRUCTURE

BACKGROUND OF THE INVENTION

1. Field Of The Invention

This invention relates generally to non-rotatable telescoping support structures, and more particularly to a support structure which is readily adaptable for use in a pole lamp wherein the electrical wires are disposed within the telescoping members and relative rotation between the members is prevented to deter damage to the electrical wires.

2. Prior Art

Gindel, U. S. Pat. No. 4,238,818 discloses a non-rotatable telescoping support structure which includes an outer elongated tubular member of substantially cylindrical shape and an inner elongated member having a portion of reduced radial size with respect to the longitudinal central axis of the inner member. The outer cylindrical member has a protuberance extending inwardly beyond the inner surface of the outer member. The protuberance is aligned with the area of reduced radial size of the inner member so that the inner member can slide longitudinally relative to the outer member. However, if relative rotation between the members is attempted, the protuberance engages the surface of reduced radial size of the inner member. A cylindrical outer end surface of the outer member is threaded to accept a split ring assembly which may be tightened on the threads to prevent longitudinal movement between the inner member and the outer member. While under normal conditions the Gindel system does deter relative rotation of the members, it is possible, with force, to push the protuberance outward and enable the inner member to be rotated within the outer member.

Another non-rotatable telescoping support structure is shown in Thines, U.S. Pat. No. 2,445,543. This structure is designed to support the roof of a mine shaft and includes a locking collar which automatically locks the inner and outer telescoping components as the inner component is extended out of the outer component. Outward extension of the inner component is permitted but the inner component cannot be slid back into the outer component without unlocking the collar. Since the structure supports considerable weight, the inner and outer components are square in cross section to provide a large area of friction between the inner component and the locking collar. The locking collar merely rides on the upper end of the outer component and is not secured to the outer component either by threading or any other means.

OBJECT OF THE INVENTION

The principal object of the present invention is to provide a non-rotatable telescoping support structure which will not rotate even when excessive rotating force is applied and yet is of simple construction and inexpensive to manufacture.

SUMMARY OF THE INVENTION

The object is accomplished by providing a support structure which includes an outer tubular component having a square cross section and external threads cut into the outer corners of one of its ends, an inner tubular component having a square cross section which is slidably received within the bore of the outer component, and a split ring assembly threadable on the outer component external threads and engagable with the outer corners of the inner component to deter relative longitudinal movement between the two components. Relative rotation is prevented by engagement of the corners of the inner component with the inner surfaces of the outer component adjacent to the corners of the outer component bore.

For the purposes of illustrating the invention, there is shown in the drawings a form which is presently preferred; it being understood, however, that this invention is not limited to the precise arrangements and instrumentalities shown.

FIG. 1 is a perspective view of the assembled support structure with the upper end portion of the inner component and lower end portion of the outer component being broken away.

FIG. 2 is an exploded view of the FIG. 1 structure, parts being broken away.

FIG. 3 is a sectional view taken along line 3—3 in FIG. 1 but on an enlarged scale.

FIG. 4 is a sectional view taken along line 4—4 in FIG. 3.

FIG. 5 is a sectional view taken along line 5—5 in FIG. 3.

DETAILED DESCRIPTION

The non-rotatable telescoping support structure shown in FIG. 1 includes an outer tubular component 10, and inner tubular component 12 and a split ring assembly 14. As shown in FIG. 3, a lamp L may be fixed to the exposed end of the inner component having external threads T cut into its external corners. A wire W running through the bore of both the inner and outer components. The wire is coiled within the tubular components to permit extension of the telescoping structure.

To prevent relative rotation between the inner and outer components, the components are preferably square in cross section. The length of the sides of the inner component is slightly less than the length of the sides of the square bore of the outer component so that the inner component may be slidably received within the bore of the outer component. If rotation is attempted the outer corners of the inner component would engage the sides of the outer component bore adjacent to the corners of the bore.

The diagonal of the inner component is substantially longer than the length of the sides of the outer component bore. Therefore a substantial amount of material would have to be deformed to permit rotation of the inner component within the outer component. Before such deformation and rotation would occur, the exposed upper portion of the inner component would twist deforming its shape.

Although it is preferred that the shape of the inner and outer component be square, any complemental shapes in which the bore of the outer component includes at least one corner and the exterior cross section of the inner component includes at least one corner would fall within the scope of the invention. While the shapes are not to be limited to regular shapes, typical examples would include triangular, pentagonal, hexagonal and octagonal. Other convex polygon shapes may be used.

The split ring assembly 14 is a standard assembly comprising a cap 16 and a split ring 18 (shown in FIG. 2). The cap 16 is substantially cylindrical with a knurled outer surface 20 to make manual rotation of the split ring assembly easier. Referring to FIG. 3, the cap 16 has internal threads 22 which complementally engage the external threads 24 of the outer component 10.

The split ring 18 is made of a flexible material and has an end portion 26 of reduced thickness. The inside diameter of the split ring 18 equals the outside diagonal of the inner component 12 and the outside diameter of the split ring 18 equals the inside diameter of the portion 28 of reduced thickness of the cap 16.

As the cap 16 is threaded onto the external threads 24 of the outer component 10, the split ring 14 is compressed between the surface 30 of the outer component and the ridge 32 of increased thickness at the end portion of the cap 16. The compression of the split ring causes it to forcefully engage the outer corners of the inner component 12 so that the inner component is retained in fixed position with respect to the outer component 10.

The prior art has unduly limited itself to the use of a split ring assembly with substantially cylindrical inner and outer components. The self-imposed limitation is most likely based on two erroneous beliefs. The first belief being that the split ring assembly had to be threaded onto a substantially cylindrical threaded end portion for there to be sufficient thread engagement. The second belief being that the split ring had to engage a major portion of the inner component circumference for there to be sufficient friction to prevent relative movement between the components. Both of these assumptions are incorrect. There is sufficient frictional force between the split ring and the inner component and sufficient thread engagement between the cap and outer component of the present invention to prevent longitudinal movement of the inner component when the split ring assembly is tightened.

As most clearly shown in FIG. 4, the split ring 18 engages the inner component 12 only at its outer corners. FIG. 5 illustrates the fact that the cap 16 engages the outer component 10 only at its outer corners and that the inner component 12 is complemental to the bore of the outer component 10.

Thus it is apparent that there has been provided, in accordance with the invention, a non-rotatable telescoping support structure which is easy and inexpensive to manufacture and yet insures no relative rotational movement between the two telescoping components even when excessive rotational force is applied.

The present invention may be embodied in other specific forms without departing from the spirit or essential attributes thereof and, accordingly, reference should be made to the appended claims, rather than to the foregoing specification, as indicating the scope of the invention.

I claim:

1. A non-rotatable telescoping support structure comprising:
    an outer tubular component having a bore of cross section the shape of a convex polygon, one end of said outer component having an external thread;
    an inner tubular component having an outer surface with a cross section of shape corresponding to the cross section of the outer component bore, said inner component being slidable within the bore of said outer component, but relative rotation being prevented by engagement of a corner of said inner component with the inner surface of said outer component adjacent to a corner of the outer component bore; and
    a split ring assembly including a cap theadable on said outer component external thread and a split ring engagable with the inner component corner to deter relative longitudinal movement between said inner component and said outer component when said cap is tightened on the outer component external thread.

2. A support structure according to claim 1 wherein the cross-sectional shape of the outer component bore and inner component exterior is selected from the group consisting of triangular, square, pentagonal, hexagonal and octagonal.

3. A support structure according to claim 2 wherein the exposed end of the inner component opposite the end of the inner component within the bore of the outer component has external threads which are cut into the exterior corners of the inner component.

4. A support structure according to claim 1 wherein the outer component has an exterior with cross-sectional shape selected from the group consisting of triangular, square, pentagonal, hexagonal and octagonal, and the external thread of the outer component on which the split ring assembly is threaded is cut into the exterior corners of the outer component.

5. A non-rotatable telescoping lamp support structure comprising:
    an outer tubular component having a bore of square cross section and having an exterior of square cross section, one end of said outer component having an external thread which is cut into the external corners of said outer component;
    an inner tubular component having an outer surface with a square cross section, said inner component being slidable within the bore of said outer component, but relative rotation being prevented by engagement of the corners of said inner component with the inner surface of said outer component adjacent to the corners of the outer component bore; and
    a split ring assembly having a cap threadable on said outer component external thread and a split ring engagable with the corners of said inner component to deter relative longitudinal movement between said inner component and said outer component when said cap is tightened on the outer component external thread.

6. A support structure according to claim 1 wherein the cross section of the outer component bore and outer surface of the inner component is a regular polygon.

* * * * *